Dec. 5, 1961  J. W. SPISELMAN  3,011,222
CONSTRUCTIONS FOR ELEVATED SECTIONAL FLOORING
Filed Oct. 18, 1960
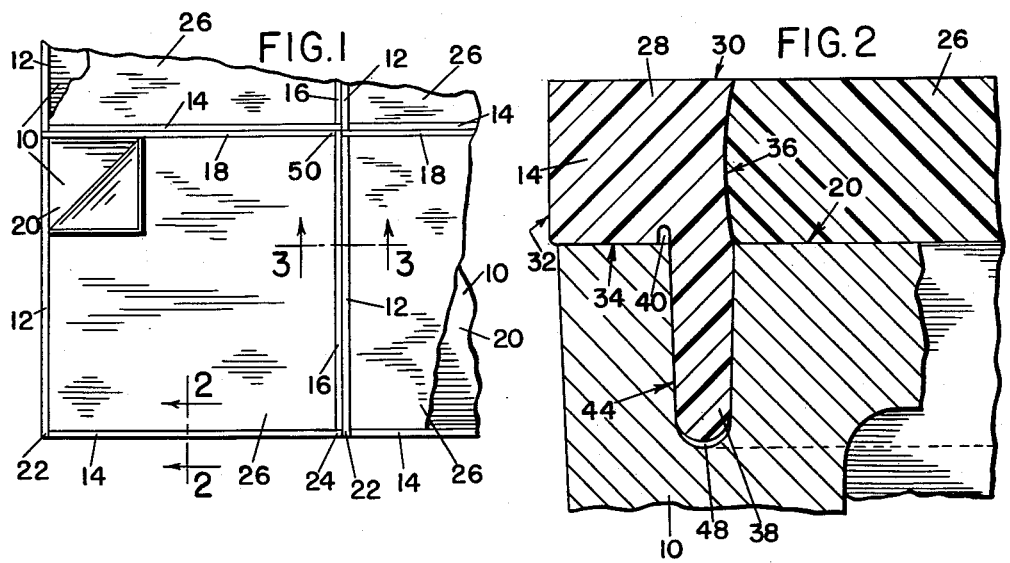
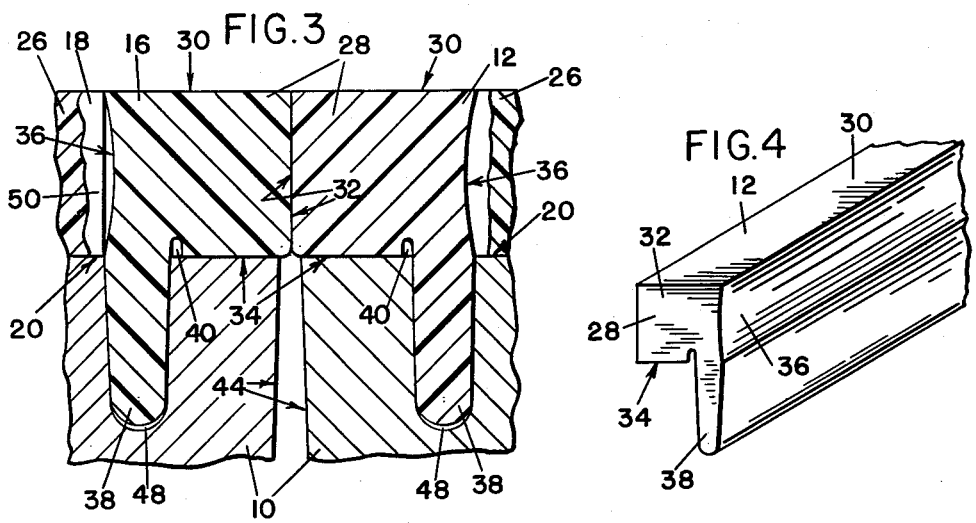
INVENTOR
JOSEPH W. SPISELMAN
ATTORNEY

1

3,011,222
CONSTRUCTIONS FOR ELEVATED
SECTIONAL FLOORING
Joseph W. Spiselman, Brooklyn, N.Y.
(% Floating Floors Inc., 22 E. 42nd St., New York, N.Y.)
Filed Oct. 18, 1960, Ser. No. 63,405
6 Claims. (Cl. 20—6)

This invention relates to new and improved elevated sectional flooring, the sections of which are easily positioned, removed and replaced for use particularly for electronic installations such as computers for the general purposes recited in Patent No. 2,830,332, dated April 15, 1958, reference to which is hereby made.

The principal object of the present invention resides in the provision of a special new and improved rim or raised lip which extends about the periphery of each of the sections of the flooring, these rims or lips being made preferably of an electric insulating material which is at the same time highly ornamental, such as extruded synthetic or natural plastic materials, and the invention contemplates means whereby the extruded plastic or similar material is substantially permanently attached to the sections, which are usually aluminum, in such a way as to provide an upstanding substantially permanent rim forming an enclosure at the top surface of each section, said enclosures being then completed or filled by providing an insert such as the usual kinds of flooring material in the nature of rubber or vinyl floor tile, cork, etc., all having well known electrically insulative properties.

Other objects of the invention include the provision of an elevated floor section provided with a small downwardly directed groove adjacent each edge thereof, said grooves being adapted to receive and hold an extruded plastic or similar strip, said plastic strip including an upper exposed rim-like portion having a downwardly extending rib or ridge or the like preferably located adjacent an edge thereof, the rib of each strip being forced downwardly into a respective groove. Preferably the groove is slightly smaller or less in width than the thickness of the downwardly extending projecting rib so that the plastic material is caused to be slightly flowed into the groove and held better; the provision of a construction for the application and holding of plastic stripping at the edge portions of the floor sections as above described including the use of adhesives for aiding in helping holding the strips in position; and the provision of an elevated floor section having an extruded plastic strip applied thereto at the edges thereof, said strip extending slightly beyond the extreme edges of the flooring section so that when other flooring sections are set to form a complete floor, the plastic strips abut each other forming a completely ornamental grid-work effect having an electric insulating quality, a good fit, reducing noise as occurs sometimes when there is no rim present, and also forming an air leakage seal so that the area between the elevated flooring and the under sub-flooring can be utilized as a plenum chamber.

The invention further relates to arrangements and combinations of parts which will be hereinafter described and more particularly set forth in the appended claims.

Reference is to be had to the accompanying drawings, in which

FIG. 1 is a top plan view of an elevated flooring according to the present invention, with parts cut away and a part of a floor tile pealed back;

FIG. 2 is a greatly enlarged sectional view on section line 2—2 of FIG. 1;

FIG. 3 is an enlarged section on line 3—3 of FIG. 1; and

FIG. 4 is a fragmentary perspective view showing the stripping.

2

Referring now to FIG. 1, the reference numeral 10 indicates the elevated flooring sections which may be mounted on pedestals as described in the aforementioned United States Patent, or on other pedestals serving the same purpose. The pedestals are mounted on a sub-flooring and the sections 10 are then mounted on the pedestals. The pedestals form no part of the present invention which is concerned with the edge stripping or rim construction.

Referring now to FIG. 1, it will be seen that each section 10 is provided with edge stripping pieces. These are indicated as four in number, as for instance at 12, 14, 16 and 18 and this is for the reason that the sections 10 are four-sided. It is pointed out that the strips 12, 14, 16 and 18 are secured to the individual sections and form a closed upwardly raised rim extending above the top surfaces of the sections which are indicated at 20. Otherwise the construction of the individual sections 10 may be as desired.

It is also to be noted that by reason of having four strips for each section as shown, the same are preferably mounted in a continuous end overlap fashion by having an end for instance at 22 of strip 12 extend to the edge of the section 10, but the strip 12 is a little shorter than the dimension of the section, by the width of a strip, so that by continuing this end overlap each strip is the same length and no miters are necessary. Once the strips are in place, the floor tile indicated at 26 may be applied. This floor tile can be any material which is desired or convenient.

The strip itself is best shown in FIGS. 2, 3 and 4 and it comprises a main body or rim portion 28 which is more or less of rectangular cross section having a substantially flat top at 30, a substantially flat edge face at 32, a substantially flat bottom edge 34 and a flat or preferably concave edge 36, which is located in the area of the main body or rim portion 28 and not into the edge depending projection or rib which is indicated at 38.

The rib 38 is comparatively narrow and it extends downwardly from the main body or rim portion 28 at the rear edge thereof at 36. Between the rib portion 38 and the main body or rim portion 28, at the junction of flat under side 34, there is an indented portion 40 which provides for the flat surface 34 to always lie flatly in intimate contact with the top edge surface 20 of the section 10.

The sections 10 have provided therein upwardly opening grooves slightly inwardly from the edges thereof, these edges being indicated as at 44, see FIGS. 2 and 3. The grooves are preferably straight and as a concrete example may be in the nature of .048" wide. The downwardly projecting rib member 38 is preferably tapering from approximately .045 to .0453 inch, and it will therefore be seen that the leading edge 46 of the downwardly projecting rib 38 is easily entered into the groove which is slightly wider. The widest portion of the projecting rib 38, being in the nature of .053 or the like, is wider than the groove, and when the rib 38 is forced downwardly into the groove, the plastic flows slightly and becomes substantially permanently set in the groove. In some cases adhesive is also applied to aid in the adhesion of the downwardly projecting rib 38 to the side walls of the groove, but this adhesive also acts in the nature of a ram in the lower end of the groove, which is indicated at 48, to also "flow" or deform the plastic to aid in making the substantially permanent connection. The grooves may not always exactly be filled, depending upon the variations of the cutter used to make the grooves and variation in the thickness of the projecting rib 38, but in any event an extremely tight connection is always made and it is practically impossible to remove the ribs 38 from the grooves 44 without cutting them out.

The concave edge at 36 allows the extreme edge of the next strip as indicated at 50 in FIG. 3 as applied to strip 18 to come up against member 16 and make a good solid closed connection at the top surface of the junction of the strips. It will be seen that if there were not the concavity 36 present, the side of the strip 16, i.e., portion 28 thereof, would tend to bulge to the left in FIG. 3, forming a gap between the edge 50 of strip 18 and the edge of the member 16, but by this novel construction a very good solid fit is provided.

It will be appreciated from FIG. 3 that the present construction provides an improved air-leakage seal so that the elevated flooring can be used for a plenum chamber. Also a great deal of noise is avoided, particularly when heavy machinery is rolled across the floor. The appearance of the floor is greatly enhanced because besides having a very close fine fit of the stripping instead of the metallic parts, a grid-work is provided which can be of contrasting color to the floor tiles 26. Furthermore, an electrically insulating effect is provided whereas if a raised metal lip were used instead of the plastic stripping described, there would be danger of grounding electric charges, and this is done away with by use of the present invention.

Having thus described my invention and the advantages thereof, I do not wish to be limited to the details herein disclosed, otherwise than as set forth in the claims, but what I claim is:

1. A flooring construction comprising a floor base, a plurality of floor panels removably mounted on the base, the floor panels being in substantially contacting relation and forming a substantially continuous floor, a separate, electrically insulative rim member positively mounted in fixed position on each panel adjacent to and disposed in conformance with the edges thereof, each rim member forming a separate open top enclosure, and electrically insulative floor finishing material within each enclosure substantially filling the same, the rim members of adjacent panels being in substantial contact.

2. The flooring construction of claim 1 wherein each floor panel has a groove adjacent each edge thereof, and each rim member includes a portion entering the respective groove and securing said rim members in position.

3. The flooring construction of claim 1 wherein each floor panel has grooves adjacent its edges and each rim member includes a depending tapering portion located and held in the respective groove.

4. The flooring construction of claim 1 wherein each floor panel has grooves adjacent its edges and each rim member includes a depending tapering portion located and held in the respective groove, the tapering portions of the rim members having parts thereof wider than the width of the grooves, the wider parts being compressed in the grooves.

5. The flooring construction of claim 1 wherein each floor panel is grooved adjacent its edges and each rim member includes a main body portion on the panel and a rib, the ribs being located and held in the grooves.

6. The flooring construction of claim 1 wherein each floor panel is grooved adjacent its edges and each rim member includes a main body portion on the panel and a rib, the ribs being located and held in the grooves, the main body portions extending laterally substantially to the extreme edges of the panels from the grooves.

References Cited in the file of this patent

UNITED STATES PATENTS

| | | |
|---|---|---|
| 1,667,313 | Galassi | Apr. 24, 1928 |
| 1,913,290 | Rockwell | June 6, 1933 |
| 2,178,535 | Willson | Oct. 31, 1939 |
| 2,705,820 | Torrence | Apr. 12, 1955 |
| 2,708,016 | Penton | May 10, 1955 |

FOREIGN PATENTS

| | | |
|---|---|---|
| 162,288 | Australia | 1955 |
| 771,380 | Great Britain | 1957 |
| 1,166,378 | France | 1958 |